United States Patent
Kwon et al.

(10) Patent No.: US 11,070,345 B2
(45) Date of Patent: Jul. 20, 2021

(54) CHANNEL MEASUREMENT FOR UPLINK TRANSMISSION

(71) Applicant: HUAWEI TECHNOLOGIES CO., LTD., Shenzhen (CN)

(72) Inventors: Young Hoon Kwon, Laguna Niguel, CA (US); Pengfei Xia, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/004,571

(22) Filed: Aug. 27, 2020

(65) Prior Publication Data

US 2020/0396046 A1  Dec. 17, 2020

Related U.S. Application Data

(63) Continuation of application No. PCT/CN2019/079785, filed on Mar. 27, 2019.
(Continued)

(51) Int. Cl.
*H04L 5/00* (2006.01)
*H04B 7/06* (2006.01)
*H04B 7/0456* (2017.01)

(52) U.S. Cl.
CPC ......... *H04L 5/0094* (2013.01); *H04B 7/0456* (2013.01); *H04B 7/0617* (2013.01);
(Continued)

(58) Field of Classification Search
CPC ...... H04B 7/04; H04B 7/0404; H04B 7/0408; H04B 7/0456; H04B 7/0482;
(Continued)

(56) References Cited

U.S. PATENT DOCUMENTS

2015/0349854 A1* 12/2015 Zhao ............... H04W 24/10
                                                    370/252
2017/0033912 A1   2/2017 Onggosanusi et al.
(Continued)

FOREIGN PATENT DOCUMENTS

CN   107852219 A   3/2018
CN   107852277 A   3/2018
(Continued)

OTHER PUBLICATIONS

Nokia, "draftCR to 38.214 capturing the Jan. 18 ad-hoc and RAN1#92 meeting agreements," 3GPP TSG-RAN1 Meeting #92, Athens, Feb. 26-Mar. 1, 2018, R1-1803546, 84 pages.

*Primary Examiner* — Young T. Tse
(74) *Attorney, Agent, or Firm* — Conley Rose, P.C.

(57) ABSTRACT

A method performed by a base station for measuring a channel state information reference signal (CSI-RS) for non-codebook based uplink (UL) transmission. The method includes transmitting information relating to a sounding reference signal (SRS) resource set for the non-codebook based UL transmission, information relating to a CSI-RS resource, a CSI-RS over the CSI-RS resource, and information relating to CSI-RS measurement restriction for measurement of the CSI-RS according to the CSI-RS measurement restriction. The measurement is for determining precoding information for the SRS resource set. The method includes receiving the SRS resource set, measuring the SRS resource set, and determining one or more SRS resources within the SRS resource set to be used for precoding the UL transmission. The method further includes transmitting a downlink control information (DCI) that indicates the SRS resources within the SRS resource set to be used for precoding the UL transmission, and receiving the UL transmission.

20 Claims, 8 Drawing Sheets

Related U.S. Application Data

(60) Provisional application No. 62/651,802, filed on Apr. 3, 2018, provisional application No. 62/657,494, filed on Apr. 13, 2018, provisional application No. 62/767,711, filed on Nov. 15, 2018.

(52) U.S. Cl.
CPC ......... *H04B 7/0626* (2013.01); *H04B 7/0632* (2013.01); *H04L 5/0023* (2013.01); *H04L 5/0048* (2013.01); *H04L 5/0057* (2013.01)

(58) Field of Classification Search
CPC .. H04B 7/0617; H04B 7/0626; H04B 7/0632; H04L 5/0023; H04L 5/0048; H04L 5/0057; H04L 5/006; H04L 5/0094; H04W 72/02; H04W 72/042
USPC ....... 375/146, 147, 259, 260, 262, 265, 267; 370/208, 210, 335, 342; 455/456.5, 455/456.6, 500, 513, 517, 524
See application file for complete search history.

(56) References Cited

U.S. PATENT DOCUMENTS

| | | |
|---|---|---|
| 2017/0041922 A1 | 2/2017 | Chen et al. |
| 2018/0220462 A1 | 8/2018 | Kusashima et al. |
| 2018/0234998 A1 | 8/2018 | You et al. |
| 2018/0287757 A1* | 10/2018 | Onggosanusi ........ H04L 5/0053 |
| 2019/0109679 A1* | 4/2019 | Liu ..................... H04L 5/005 |
| 2019/0379501 A1* | 12/2019 | Park .................... H04B 7/0456 |
| 2020/0244335 A1* | 7/2020 | Nilsson .............. H04B 7/0452 |
| 2020/0336264 A1* | 10/2020 | Faxer ................. H04W 72/042 |

FOREIGN PATENT DOCUMENTS

| | | |
|---|---|---|
| CN | 107852313 A | 3/2018 |
| CN | 107852612 A | 3/2018 |

* cited by examiner

CHANNEL MEASUREMENT FOR UPLINK TRANSMISSION

CROSS-REFERENCE TO RELATED APPLICATIONS

This application is a continuation of International Application No. PCT/CN2019/079785 filed on Mar. 27, 2019, by Huawei Technologies Co., Ltd., and titled "Channel Measurement for Uplink Transmission," which claims the benefit of U.S. Provisional Patent Application No. 62/651,802 filed Apr. 3, 2018 titled "Channel Measurement for Uplink Transmission," and U.S. Provisional Patent Application No. 62/657,494 filed Apr. 13, 2018 titled "Channel Measurement for Uplink Transmission", and U.S. Provisional Patent Application No. 62/767,711 filed Nov. 15, 2018 titled "Channel Measurement for Uplink Transmission", all of which are incorporated by reference in their entireties.

TECHNICAL FIELD

Embodiments of the present disclosure relate to the field of network communications, and in particular, to a method and an apparatus for measuring channel state information reference signal (CSI-RS).

BACKGROUND

In wireless communications, channel state information (CSI) refers to known channel properties of a communication link. This information describes how a signal propagates from the transmitter to the receiver and represents the combined effect of, for example, scattering, fading, and power decay with distance. CSI-RS is used by the user equipment (UE) to estimate the channel and report channel quality information (CQI) to the base station.

SUMMARY

A first aspect relates to a method performed by a base station for measuring a channel state information reference signal (CSI-RS) for non-codebook based uplink (UL) transmission. The method includes transmitting information relating to a sounding reference signal (SRS) resource set for the non-codebook based UL transmission, information relating to a CSI-RS resource, a CSI-RS over the CSI-RS resource, and information relating to CSI-RS measurement restriction for measurement of the CSI-RS according to the CSI-RS measurement restriction. The measurement is for determining precoding information for the SRS resource set. The method also includes receiving the SRS resource set, measuring the SRS resource set, and determining one or more SRS resources within the SRS resource set to be used for precoding the non-codebook based UL transmission. The method further includes transmitting a downlink control information (DCI) that indicates the SRS resources within the SRS resource set to be used for precoding the non-codebook based UL transmission, and receiving the non-codebook based UL transmission.

A second aspect relates to a method performed by a user equipment (UE) for measuring a channel state information reference signal (CSI-RS) for non-codebook based uplink (UL) transmission. The method includes receiving information relating to a sounding reference signal (SRS) resource set for the non-codebook based UL transmission, information relating to a CSI-RS resource, and information relating to CSI-RS measurement restriction. The method also includes measuring the CSI-RS resource based on the information relating to the CSI-RS measurement restriction, and determining precoding information for the SRS resource set based on the measurement of the CSI-RS resource. The method further includes transmitting the SRS resource set precoded based on the precoding information for the SRS resource set, receiving a downlink control information (DCI) that indicates the SRS resources within the SRS resource set to be used for the non-codebook based UL transmission, and transmitting the non-codebook based UL transmission.

In a first implementation form of the method according to either the first aspect or the second aspect as such, the CSI-RS measurement restriction specifies that the CSI-RS resource associated with the SRS resource set for the non-codebook based UL transmission that is to be measured occurs at least a first time before scheduling a transmission of the SRS resource set.

In a second implementation form of the method according to either the first aspect or the second aspect as such, the CSI-RS measurement restriction specifies that the CSI-RS resource associated with the SRS resource set for the non-codebook based UL transmission that is to be measured occurs at a first instance after the message that triggers a transmission of the SRS resource set.

In a third implementation form of the method according to either the first aspect or the second aspect as such, the CSI-RS measurement restriction specifies that the CSI-RS resource associated with the SRS resource set for the non-codebook based UL transmission that is to be measured occurs at a latest instance before the message that triggers a transmission of the SRS resource set.

In a fourth implementation form of the method according to either the first aspect or the second aspect as such, the CSI-RS measurement restriction specifies that the CSI-RS resource associated with the SRS resource set for the non-codebook based UL transmission that is measured is one or more CSI-RS resources associated with the SRS resource set for the non-codebook based UL transmission that occurs between a latest instance before the message that triggers a transmission of the SRS resource set and a first time before scheduling a transmission of the SRS resource set.

In a fifth implementation form of the method according to either the first aspect or the second aspect as such or any preceding implementation form of either the first aspect or the second aspect, the information relating to CSI-RS measurement restriction is transmitted in a first radio resource control (RRC) message, and an indication for measurement restriction for the UE's channel quality indicator (CQI) and channel state information (CSI) measurements is transmitted in a second RRC message.

In a sixth implementation form of the method according to either the first aspect or the second aspect as such or any preceding implementation form of either the first aspect or the second aspect, the information relating to CSI-RS measurement restriction is applied to a periodic channel state information reference signal (P-CSI-RS) resource that is associated with the SRS resource set.

In a seventh implementation form of the method according to either the first aspect or the second aspect as such or any preceding implementation form of either the first aspect or the second aspect, the information relating to CSI-RS measurement restriction is applied to a semi-periodic channel state information reference signal (SP-CSI-RS) resource that is associated with the SRS resource set.

In an eighth implementation form of the method according to either the first aspect or the second aspect as such or any preceding implementation form of either the first aspect or the second aspect, the information relating to CSI-RS measurement restriction is transmitted in a radio resource control (RRC) message.

In an eighth implementation form of the method according to the eighth implementation form of either the first aspect or the second aspect, the RRC message further comprises an indication for measurement restriction for the UE's CQI/CSI measurement.

A third aspect relates to a method performed by a UE for measuring a CSI-RS for non-codebook based UL transmission. The method receives information relating to a SRS resource set for the non-codebook based UL transmission and a CSI-RS resource associated with the SRS resource set, a request for a transmission of the SRS resource set, and the CSI-RS resource. The method determines precoding information for the SRS resource set based on a measurement of the CSI-RS resource in accordance with a specific instance of a CSI-RS resource specified for a downlink channel measurement. The method transmits the SRS resource set precoded based on the precoding information for the SRS resource set. The method receives a DCI that indicates the SRS resources within the SRS resource set to be used for the non-codebook based UL transmission. The method transmits an uplink frame using the precoding information applied to the indicated SRS resources within the SRS resource set.

In a first implementation form of the method according to the third aspect as such, the method further determines whether the UE is configured with a higher layer parameter used by the gNB for specifying the measurement restriction for CQI measurement. If the UE is not configured with the higher layer parameter, the method derives channel measurements for computing a CQI value reported in uplink slot n based on only a non-zero power (NZP) CSI-RS, no later than a CSI reference resource, associated with a CSI resource setting; and derives channel measurements for computing precoder for the SRS resource set scheduled in uplink slot n based on only the CSI-RS associated with the SRS resource set. If the UE is configured with the higher layer parameter, the method derives the channel measurements for computing the CQI value reported in the uplink slot n based on only a most recent, no later than the CSI reference resource, occasion of the NZP CSI-RS associated with the CSI resource setting; and derives the channel measurements for computing precoder for the SRS resource set scheduled in the uplink slot n based on only a latest CSI-RS resource associated with the SRS resource set that ends prior to 42 symbols before the SRS resource set is transmitted.

In a second implementation form of the method according to the third aspect as such, the method further determines whether the UE is configured with a higher layer parameter used by the gNB for specifying the measurement restriction for CQI measurement. If the UE is not configured with the higher layer parameter, the method derives channel measurements for computing a channel quality indicator (CQI) value reported in uplink slot n based on only a non-zero power (NZP) CSI-RS, no later than a CSI reference resource, associated with a CSI resource setting; and derives channel measurements for computing precoder for the SRS resource set scheduled in uplink slot n based on only the CSI-RS associated with the SRS resource set. If the UE is configured with the higher layer parameter, the method derives the channel measurements for computing the CQI value reported in the uplink slot n based on only a most recent, no later than the CSI reference resource, occasion of the NZP CSI-RS associated with the CSI resource setting; and derives the channel measurements for computing precoder for the SRS resource set scheduled in the uplink slot n based on only a first CSI-RS resource associated with the SRS resource set after an indication of dynamic SRS transmission request.

In a third implementation form of the method according to the third aspect as such, the method further determines whether the UE is configured with a higher layer parameter used by the gNB for specifying the measurement restriction for CQI measurement. If the UE is not configured with the higher layer parameter, the method derives channel measurements for computing a channel quality indicator (CQI) value reported in uplink slot n based on only a non-zero power (NZP) CSI-RS, no later than a CSI reference resource, associated with a CSI resource setting; and derives channel measurements for computing precoder for the SRS resource set scheduled in uplink slot n based on only the CSI-RS, no later than the CSI reference resource, associated with the SRS resource set. If the UE is configured with the higher layer parameter, the method derives the channel measurements for computing the CQI value reported in the uplink slot n based on only a most recent, no later than the CSI reference resource, occasion of the NZP CSI-RS associated with the CSI resource setting; and derives the channel measurements for computing precoder for the SRS resource set scheduled in the uplink slot n based on only a most recent, no later than the CSI reference resource, occasion of the CSI-RS resource associated with the SRS resource set.

In a fourth implementation form of the method according to the third aspect as such or any preceding implementation form of the third aspect, the higher layer parameter is a MeasRestrictionConfig-time-channel parameter.

A fourth aspect relates to a method performed by a UE for measuring a CSI-RS for non-codebook based UL transmission. The method receives information relating to a SRS resource set for the non-codebook based UL transmission and a CSI-RS resource associated with the SRS resource set. The method determines that information relating to CSI-RS measurement restriction is not received from a base station. The method receives a message that indicates a request for a SRS resource set transmission. The method determines precoding information for the SRS resource set based on a measurement of the CSI-RS resource based on unrestricted observation interval in time. The method transmits the SRS resource set precoded based on the precoding information for the SRS resource set. The method receives a downlink control information (DCI) that indicates the SRS resources within the SRS resource set to be used for uplink transmission. The method transmits an uplink frame based on the precoding information applied to the indicated SRS resources within the SRS resource set.

A fifth aspect relates to an apparatus comprising at least a processor and memory specially configured to perform any of the preceding aspects as such or any preceding implementation form of any of the preceding aspects.

Advantages of the preceding aspects and corresponding implementations include enabling a more accurate measurement of CSI-RS by a UE for calculating precoder of a SRS resource set for non-codebook based UL transmission. Another advantage is that a base station can adjust beams for CSI-RS adaptively and indicate to a UE to measure the CSI-RS properly for the non-codebook based UL transmission.

Details of the above aspects and other aspects, and additional advantages thereof, are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides various embodiments for measuring CSI-RS for calculating precoder of a SRS resource set for non-codebook based UL transmission. Advantages of the disclosed embodiments include a more accurate measurement of CSI-RS by a UE for calculating precoder of a SRS resource set for non-codebook based UL transmission. Another advantage is that a base station such as a fifth generation (5G) nodeB (gNB) can adjust beams for CSI-RS adaptively and indicate UE to measure the CSI-RS properly for non-codebook based UL transmission.

Figure 1:
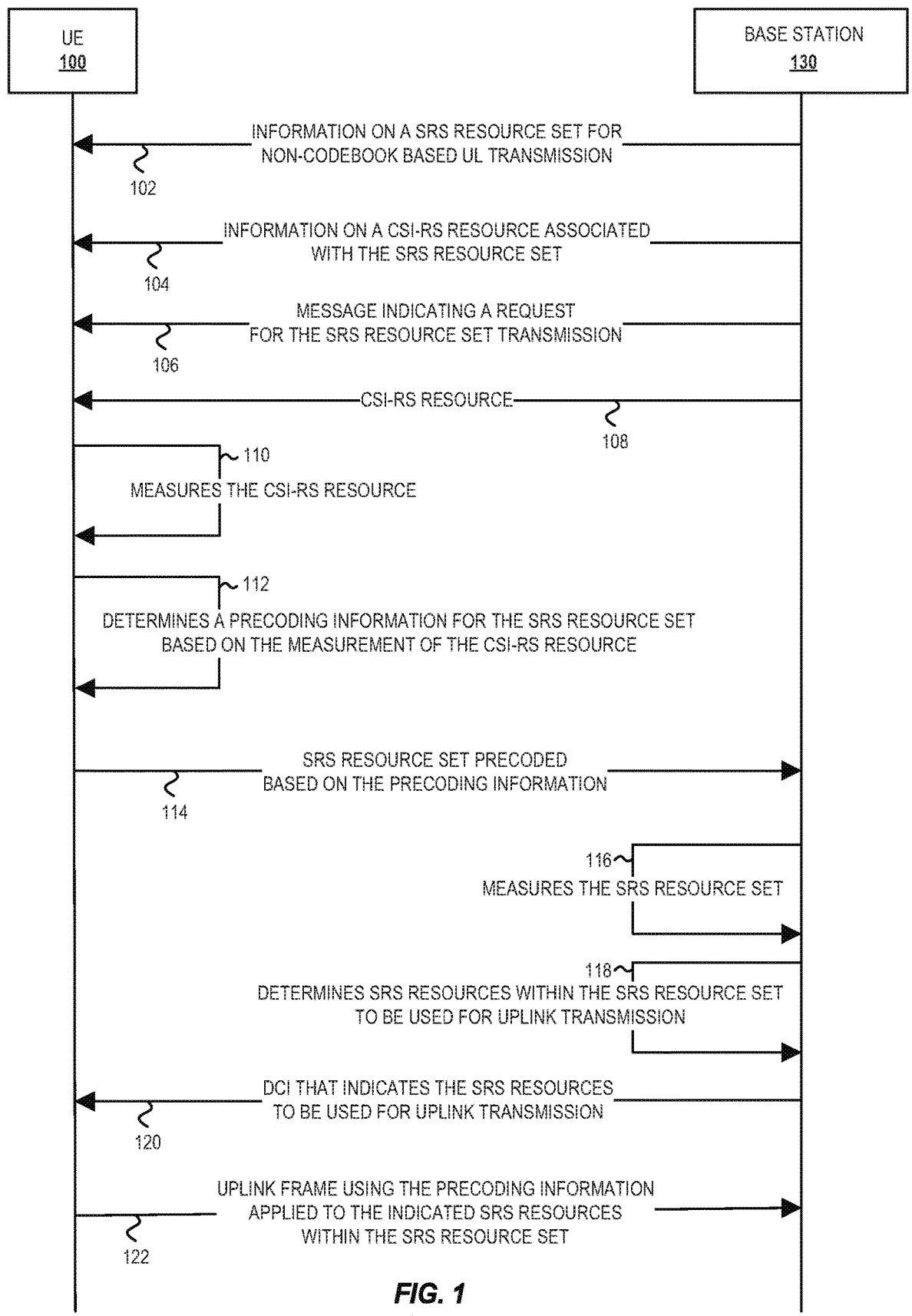
FIG. 1 is a sequence diagram illustrating a generic operation procedure between a UE and base station for non-codebook based UL transmission in accordance with prior art.

FIG. 1 is a sequence diagram illustrating a generic operation procedure between a UE 100 and base station 130 for non-codebook based UL transmission. In an embodiment, the base station 130 is a gNB. UE 100 is any type of UE that is capable of communicating with the base station 130. In an embodiment, the base station 130 is a fifth generation (5G) base station. However, it is foreseeable that the disclosed embodiments can apply to other generations of a base station.

In the depicted embodiment, the base station 130, at step 102, transmits information relating to a SRS resource set for non-codebook based UL transmission to the UE 100. At step 104, the base station 130 transmits information relating to a CSI-RS resource associated with the SRS resource set to the UE 100. In some embodiments, the information relating to a SRS resource set for non-codebook based UL transmission (step 102) and the information relating to a CSI-RS resource associated with the SRS resource set (step 104) can be transmitted in one message or information element. At step 106, the base station 130 transmits a message that indicates a request for a transmission of the SRS resource set to the UE 100. At step 108, the base station 130 transmits the CSI-RS resource. In some embodiments, the CSI-RS (step 108) can be transmitted before, after, or both before and after, the transmission of the message that indicates a request for a transmission of the SRS resource set (step 106).

After receiving the CSI-RS resource, the UE 100, at step 110, measures the CSI-RS resource. At step 112, the UE 100 determines precoding information for the SRS resource set based on the measurement of the CSI-RS resource. The UE 100, at step 114, transmits the SRS resource set precoded based on the precoding information.

After receiving the SRS resource set precoded based on the precoding information from the UE 100, the base station 130, at step 116, measures the SRS resource set. The base station 130, at step 118, determines SRS resources within the SRS resource set to be used for uplink transmission. The base station 130, at step 120, transmits a DCI that indicates the SRS resources to be used for UL transmission. The UE 100, at step 122, transmits an uplink frame using the precoding information applied to the indicated SRS resources within the SRS resource set.

Figure 2:
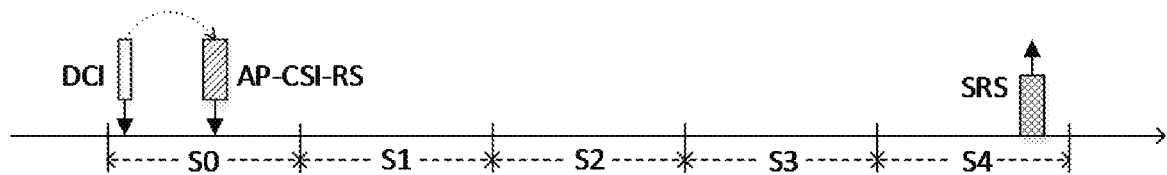
FIG. 2 is a schematic diagram illustrating an instance where a dynamic SRS transmission request for aperiodic SRS transmission is received in the same slot as the reception of the DL CSI-RS resource.

As described in FIG. 1, for a UE 100 to determine precoding information for the SRS resource set (step 112), the UE 100 measures an associated CSI-RS resource (step 110). If a gNB triggers a transmission of an aperiodic CSI-RS (AP-CSI-RS) resource for non-codebook based UL transmission via a DCI field that triggers the SRS transmission, the AP-CSI-RS resource to be used for measurement can be clearly identified. A UE may receive the dynamic SRS transmission request for aperiodic SRS transmission in the same slot as the reception of the downlink (DL) CSI-RS resource (as illustrated in FIG. 2). As shown in FIG. 2, a DCI is sent in slot S0, and this DCI is the dynamic SRS transmission request for aperiodic SRS transmission. This DCI also indicates the AP-CSI-RS that is to be measured by the UE for estimating the channel. As shown, the AP-CSI-RS is transmitted in the same slot as the dynamic SRS transmission request (both are in slot S0). After measuring the AP-CSI-RS, the UE transmits the SRS at a designated slot (S4). In the depicted example, because the DCI specifically indicates the time for the AP-CSI-RS transmission, it is clear for the UE to figure out when and which resource to measure. In some embodiments, a UE is not expected to update the SRS precoding information if the gap from the last symbol of the reception of the AP-CSI-RS resource and the first symbol of the AP-SRS transmission is less than 42 orthogonal frequency-division multiplexing (OFDM) symbols.

Figure 3:
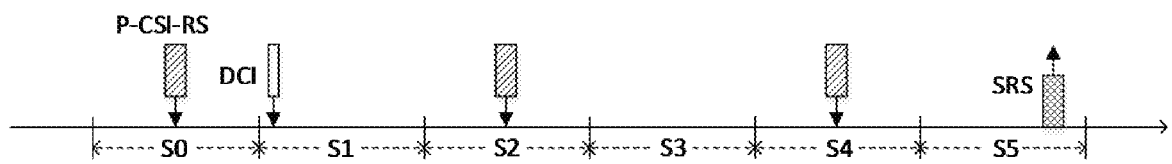
FIG. 3 is a schematic diagram illustrating an instance where CSI-RS transmission occurs in a different slot from the slot of the DCI.

However, if a periodic or semi-persistent CSI-RS (P/SP-CSI-RS) resource is associated for non-codebook based UL transmission, a UE does not know which CSI-RS resource to measure for calculating precoding information for the SRS resource set because there is a series of CSI-RS resource scheduled and transmitted, and the CSI-RS transmission can happen in a different slot from the slot that the DCI is transmitted (as illustrated in FIG. 3). As shown in FIG. 3, the DCI sent in slot S0 that is the dynamic SRS transmission request for aperiodic SRS transmission is associated with P-CSI-RS. Each instance of P-CSI-RS resource happens periodically and it has been predefined even before the transmission of the DCI. In this particular example, the P-CSI-RS happens in every other slot. Thus, in this case, after receiving the DCI, there are multiple P-CSI-RS instances (S0/S2/S4), and therefore, the UE does not know which instance(s) of the P-CSI-RS that the UE needs to measure to determine the SRS transmission. Moreover, it is possible that the gNB may use different beam at different instance of P/SP-CSI-RS transmission, in which case, measurement on different instance of P/SP-CSI-RS may result in different precoding for SRS resource set.

Accordingly, the disclosed embodiments seek to provide solutions to one or more of the above described problems. In one embodiment, if there is more than one instance of CSI-RS resource associated with a SRS resource set for non-codebook based UL transmission, indicates whether a UE needs to measure a specific instance(s) of the CSI-RS resource (or not) for calculating precoding information of the SRS resource set. In some embodiments, if the gNB indicates that the UE needs to measure a specific instance(s) of the CSI-RS resource, the UE measures the specific CSI-RS for calculating precoding information of the SRS resource set. If the gNB indicates that the UE does not need to measure a specific instance(s) of the CSI-RS resource, the UE can determine how to utilize the measurement results of multiple instances of the CSI-RS resource for calculating precoding information of the SRS resource set.

Figure 4:
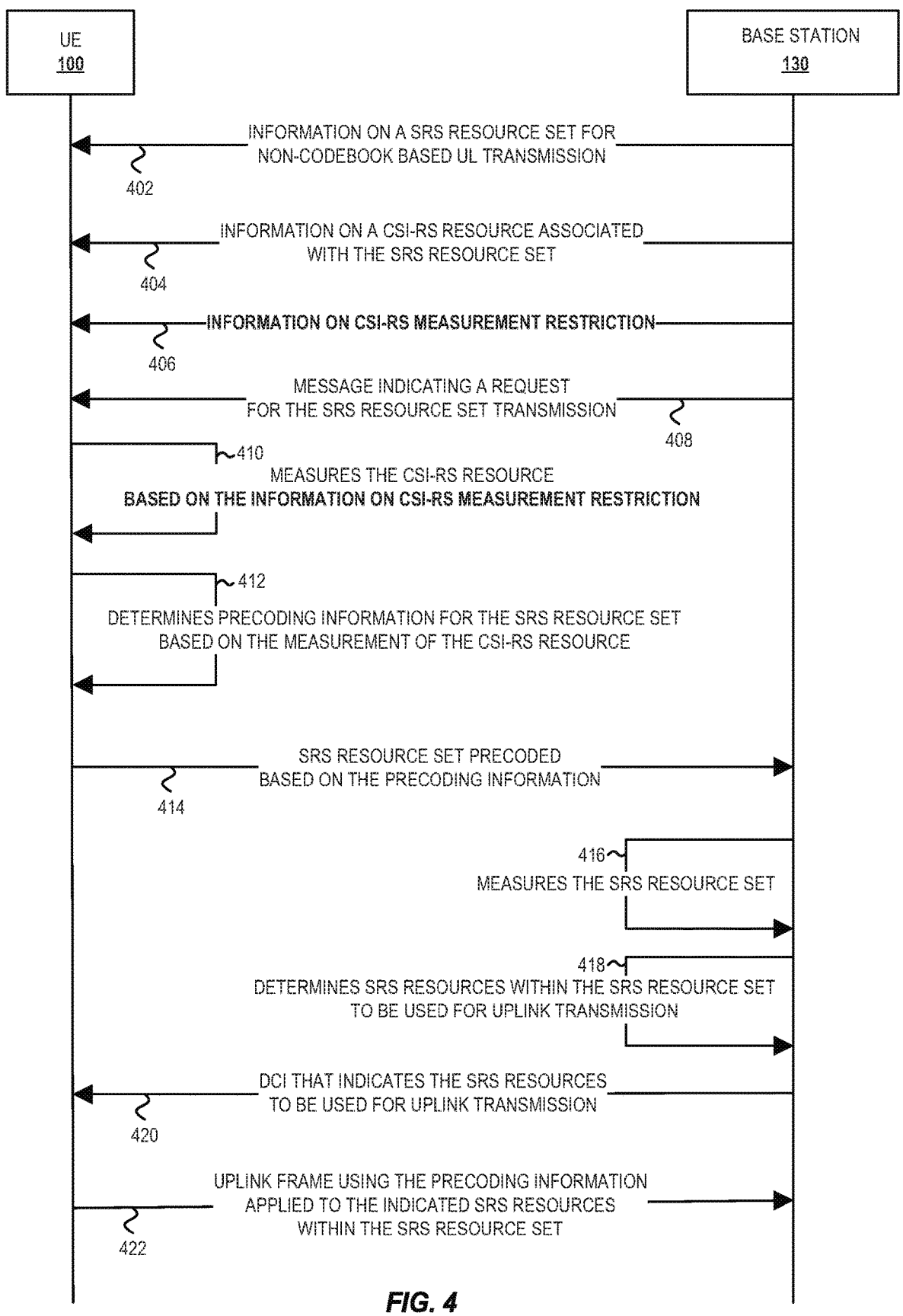
FIG. 4 is a sequence diagram illustrating a procedure between a UE and base station for non-codebook based UL transmission in accordance with an embodiment of the present disclosure.

FIG. 4 is a sequence diagram illustrating a procedure between a UE 100 and base station 130 for non-codebook based UL transmission in accordance with an embodiment of the present disclosure. In the depicted embodiment, the base station 130, at step 402, transmits information relating to a SRS resource set for non-codebook based UL transmission to the UE 100. At step 404, the base station 130 transmits information relating to a CSI-RS resource associated with the SRS resource set to the UE 100. In accordance with the disclosed embodiments, at step 406, the base station 130 transmits information relating to CSI-RS measurement restriction. In some embodiments, the information relating to a SRS resource set for non-codebook based UL transmission (step 402), the information relating to a CSI-RS resource associated with the SRS resource set (step 404), and the information relating to CSI-RS measurement restriction (step 406) can be transmitted in one message or information element. As stated above, this information indicates whether a UE needs to measure a specific instance or instance(s) of the CSI-RS resource for calculating precoding information of the SRS resource set, and if so, which instance or instances of the CSI-RS resource are to be measured. In one embodiment, if the base station 130 indicates that the UE does not need to measure a specific instance(s) of the CSI-RS resource, the UE can decide how to utilize the measurement results of multiple instances of the CSI-RS resource for calculating precoding information of the SRS resource set.

At step 408, the base station 130 transmits a message that indicates a request for a transmission of the SRS resource set. In some embodiments, the message that indicates a request for a transmission of the SRS resource set can be a DCI, a radio resource control (RRC), and/or a medium access control with a control element (MAC CE) message. At step 410, the UE 100 measures the CSI-RS resource(s) based on the information relating to CSI-RS measurement restriction. In some embodiments, the measurement of the CSI-RS resource(s) (step 410) can be performed multiple times. The measurement of the CSI-RS resource(s) (step 410) can also occur before the base station 130 transmits a message that indicates a request for a transmission of the SRS resource set (step 408). In cases where the measurement of the CSI-RS resource(s) is performed multiple times, the measurement of the CSI-RS resource(s) (step 410) can be performed both before and after the base station 130 transmits a message that indicates a request for a transmission of the SRS resource set (step 408).

At step 412, the UE 100 determines precoding information for the SRS resource set based on the measurement of the CSI-RS resource. At step 414, the UE 100 transmits the SRS resource set precoded based on the precoding information. At step 416, the base station 130 measures the SRS resource set. At step 418, the base station 130 determines SRS resources within the SRS resource set to be used for UL transmission. At step 420, the base station 130 transmits a DCI that indicates the SRS resources to be used for UL transmission. The UE 100, at step 422, transmits an uplink frame using the precoding information applied to the indicated SRS resources within the SRS resource set.

Figure 5:
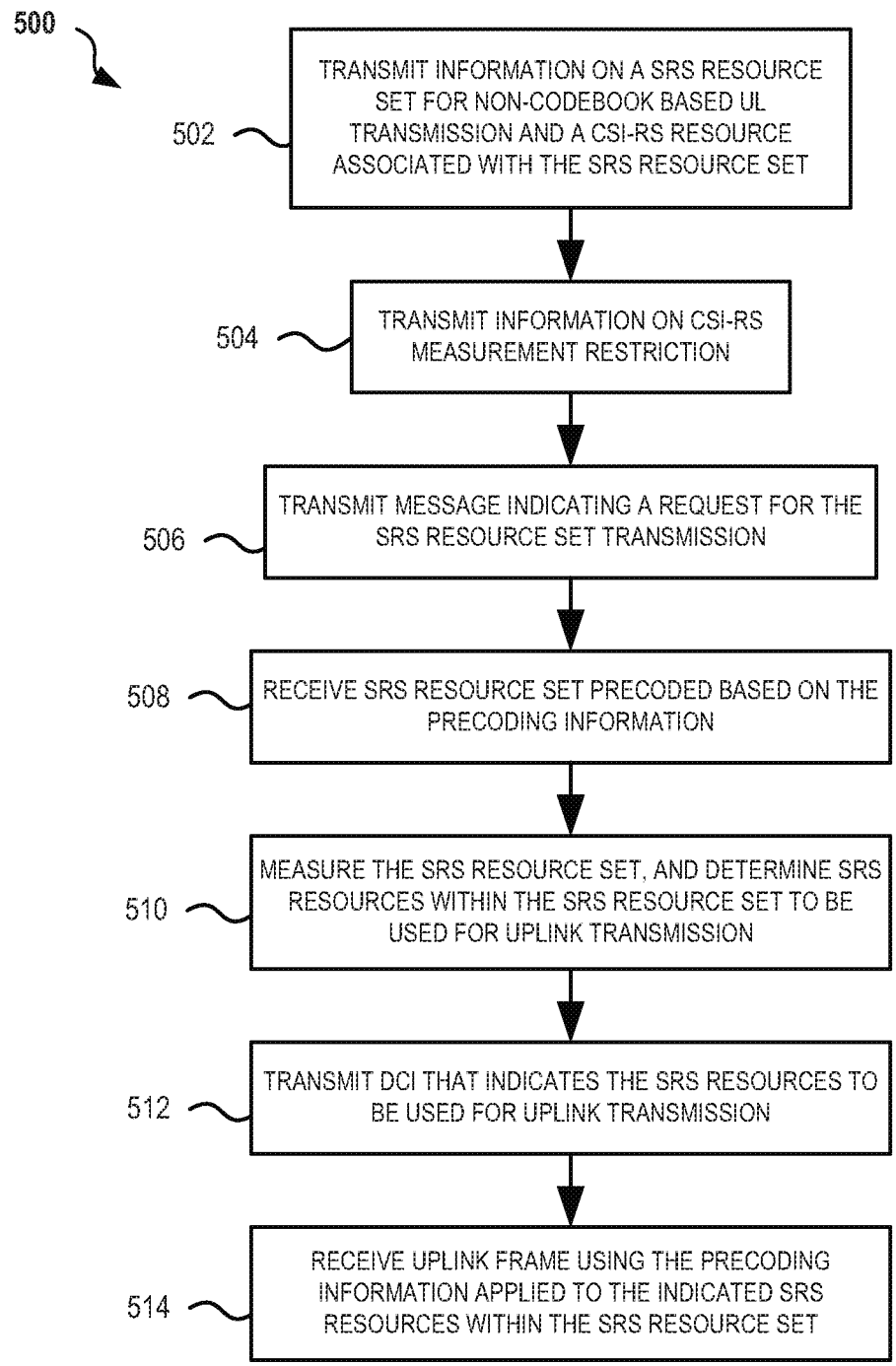
FIG. 5 is a flowchart illustrating a method for non-codebook based UL transmission performed by a base station in accordance with an embodiment of the present disclosure.

FIG. 5 is a flowchart illustrating a method 500 for non-codebook based UL transmission performed by a gNB in accordance with an embodiment of the present disclosure. In the depicted embodiment, at step 502, the method 500 transmits information relating to a SRS resource set for non-codebook based UL transmission and a CSI-RS resource associated with the SRS resource set to a UE. At step 504, the method 500 transmits information relating to CSI-RS measurement restriction to the UE. At step 506, the method 500 transmits a message that indicates a request for a transmission of the SRS resource set to the UE. As stated above, in some embodiments, the message can be a DCI, a RRC, and/or a MAC CE message.

At step 508, the method 500 receives the SRS resource set precoded based on the precoding information from the UE. The method 500, at step 510, measures the SRS resource set, and determines SRS resources within the SRS resource set to be used for UL transmission. The method 500, at step 512, transmits a DCI that indicates the SRS resources to be used for UL transmission to the UE. At step 514, the method 500 receives, from the UE, an uplink frame using the precoding information applied to the indicated SRS resources within the SRS resource set.

Figure 6:
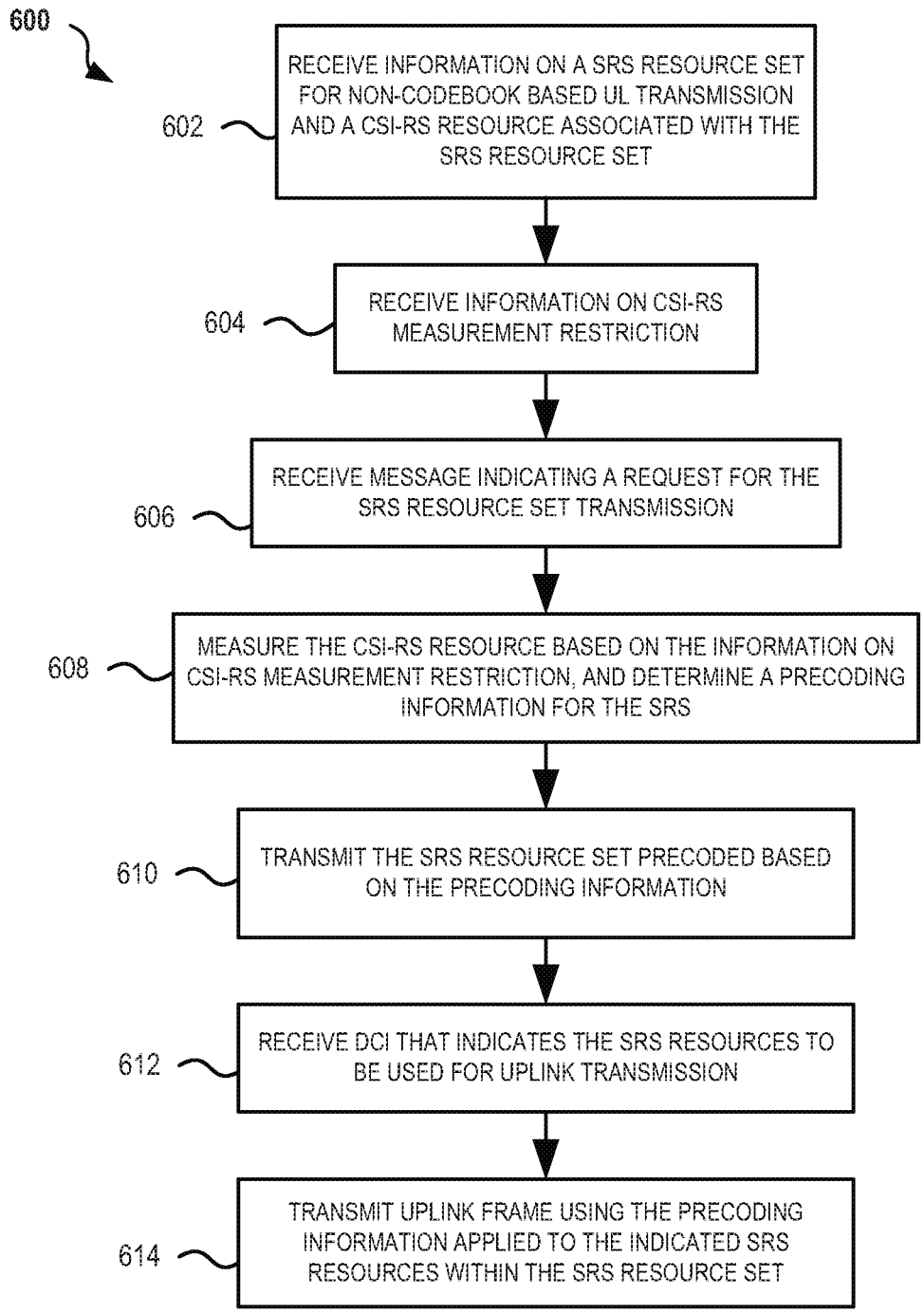
FIG. 6 is a flowchart illustrating a method for non-codebook based UL transmission performed by a UE in accordance with an embodiment of the present disclosure.

FIG. 6 is a flowchart illustrating a method 600 for non-codebook based UL transmission performed by a UE in accordance with an embodiment of the present disclosure. In the depicted embodiment, at step 602, the method 600 receives information relating to a SRS resource set for non-codebook based UL transmission and a CSI-RS resource associated with the SRS resource set from a gNB. At step 604, the method 600 receives information relating to CSI-RS measurement restriction. The method 600, at step 606, receives a message, such as, but not limited to, a DCI, a RRC, and/or a MAC CE message that indicates a request for a transmission of the SRS resource set. At step 608, the method 600 measures the CSI-RS resource based on the information relating to CSI-RS measurement restriction, and determines precoding information for the SRS. At step 610, the method 600 transmits the SRS resource set precoded based on the precoding information. The method 600, at step 612, receives a DCI that indicates the SRS resources to be used for UL transmission. The method 600, at step 614, transmits an uplink frame using the precoding information applied to the indicated SRS resources within the SRS resource set.

Figure 7:
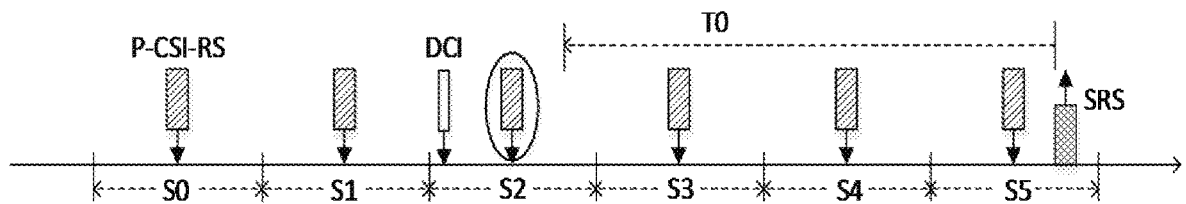
FIG. 7 is a schematic diagram illustrating a specific instance of a CSI-RS resource associated with a SRS resource set for non-codebook based UL transmission that happens at least a first time before the scheduled SRS resource set transmission in accordance with an embodiment of the present disclosure.

FIGS. 7-11 illustrate various specific instances that a gNB can indicate to a UE for calculating precoding information of the SRS resource set in accordance with the disclosed embodiments of the present disclosure. The depicted instances in FIGS. 7-11 are just some examples and do not limit the scope of the disclosed embodiments. For example, FIG. 7 is a schematic diagram illustrating a specific instance of a CSI-RS resource associated with a SRS resource set for non-codebook based UL transmission that happens at least a first time before the scheduled SRS resource set transmission in accordance with an embodiment of the present disclosure. As an example, the first time (T0) is set to 3 slots. In the disclosed examples, the number of OFDM symbols within a slot is 14, so 3 slots are 42 symbols. In the depicted embodiment, DCI is transmitted at slot #2 (S2) and SRS transmission is scheduled at slot #5 (S5). P-CSI-RS at S2 (circled) is the CSI-RS resource that occurs at least a first time before scheduled SRS resource set transmission (i.e., at least 3 slots before the SRS transmission). Therefore, in this example, P-CSI-RS at S2 is used for measuring the CSI-RS resource to determine precoding information for the SRS.

Figure 8:
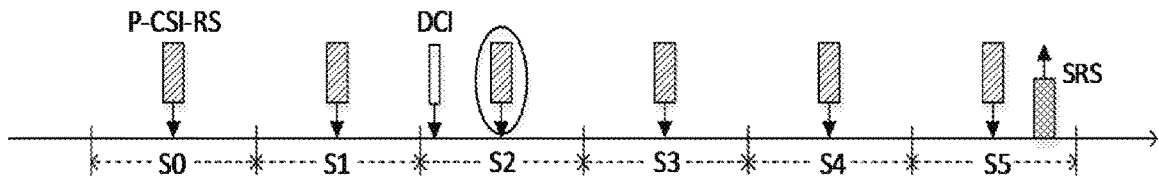
FIG. 8 is a schematic diagram illustrating a specific instance of a CSI-RS resource associated with a SRS resource set for non-codebook based UL transmission that happens a first instance after a DCI that triggers a transmission of the SRS resource set in accordance with an embodiment of the present disclosure.

FIG. 8 is a schematic diagram illustrating a specific instance of a CSI-RS resource associated with a SRS resource set for non-codebook based UL transmission that happens a first instance after a DCI that triggers a transmission of the SRS resource set in accordance with an embodiment of the present disclosure. For example, in the depicted embodiment, DCI is transmitted at slot #2 (S2) and SRS transmission is scheduled at slot #5 (S5). P-CSI-RS at S2 (circled) is the CSI-RS resource that occurs a first instance after a DCI that triggers a transmission of the SRS resource set. Therefore, in this example, P-CSI-RS at S2 is used for measuring the CSI-RS resource to determine precoding information for the SRS.

Figure 9:
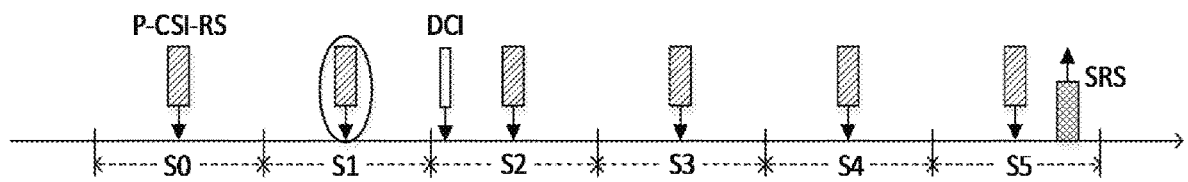
FIG. 9 is a schematic diagram illustrating a specific instance of a CSI-RS resource associated with a SRS resource set for non-codebook based UL transmission that happens the latest instance before a DCI that triggers a transmission of the SRS resource set in accordance with an embodiment of the present disclosure.

FIG. 9 is a schematic diagram illustrating a specific instance of a CSI-RS resource associated with a SRS resource set for non-codebook based UL transmission that happens the latest instance before a DCI that triggers a transmission of the SRS resource set in accordance with an embodiment of the present disclosure. In the depicted embodiment, DCI is transmitted at slot #2 (S2) and SRS transmission is scheduled at slot #5 (S5). P-CSI-RS at S1 (circled) is the CSI-RS resource that occurs the latest instance before a DCI that triggers a transmission of the SRS resource set. Thus, for this specific instance, P-CSI-RS at S1 is used for measuring the CSI-RS resource to determine precoding information for the SRS.

Figure 10:
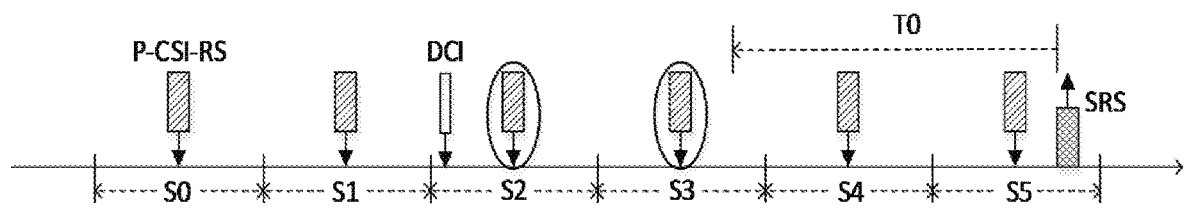
FIG. 10 is a schematic diagram illustrating a specific instance of one or more CSI-RS resources associated with a SRS resource set for non-codebook based UL transmission that happen after a DCI that triggers a transmission of the SRS resource set and a first time before the scheduled SRS resource set transmission in accordance with an embodiment of the present disclosure.

FIG. 10 is a schematic diagram illustrating a specific instance of one or more CSI-RS resources associated with a SRS resource set for non-codebook based UL transmission that happen after a DCI that triggers a transmission of the SRS resource set and a first time before the scheduled SRS resource set transmission (i.e., requiring both conditions of FIG. 7 and FIG. 8) in accordance with an embodiment of the present disclosure. For example, in the depicted embodiment, the first time (T0) is set to 2 slots (28 symbols). DCI is transmitted at slot #2 (S2) and SRS transmission is scheduled at slot #5 (S5). Both P-CSI-RS at S2 and at S3 (circled) meet the conditions of occurring after a DCI that triggers a transmission of the SRS resource set and a first time before the scheduled SRS resource set transmission (i.e., before SRS transmission+2 slots (T0)). Therefore, for the illustrated example, both P-CSI-RS at S2 and at S3 are used for measuring the CSI-RS resource to determine precoding information for the SRS.

Figure 11:
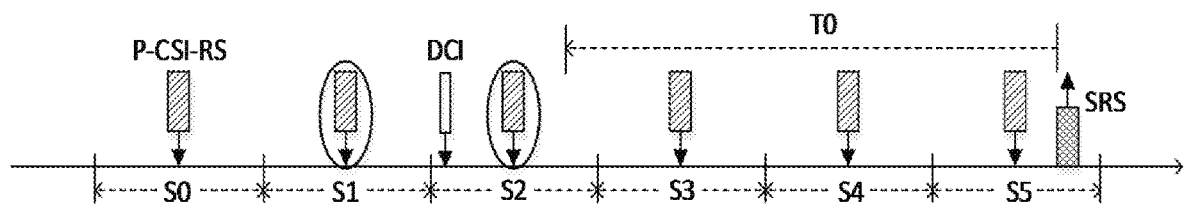
FIG. 11 is a schematic diagram illustrating a specific instance of one or more CSI-RS resources associated with a SRS resource set for non-codebook based UL transmission that occurs between the latest instance before a DCI that triggers a transmission of the SRS resource set and a first time before the scheduled SRS resource set transmission in accordance with an embodiment of the present disclosure.

FIG. 11 is a schematic diagram illustrating a specific instance of one or more CSI-RS resources associated with a SRS resource set for non-codebook based UL transmission that happen between the latest instance before a DCI that triggers a transmission of the SRS resource set and a first time before the scheduled SRS resource set transmission (i.e., combination of conditions of FIG. 7 and FIG. 9) in accordance with an embodiment of the present disclosure. For example, in the depicted embodiment, the first time (T0) is set to 3 slots (42 symbols). DCI is transmitted at slot #2 (S2) and SRS transmission is scheduled at slot #5 (S5). In this example, P-CSI-RS at S1 (circled) is the latest instance before a DCI that triggers a transmission of the SRS resource set and S2 (circled) occurs a first time before the scheduled SRS resource set transmission (i.e., SRS transmission+3 slots (T0)). Thus, in the illustrated example, both P-CSI-RS at S1 and at S2 are used for measuring the CSI-RS resource to determine precoding information for the SRS.

In accordance with the disclosed embodiments, the gNB can indicate the CSI-RS measurement restriction using various techniques such as, but not limited to, linking it to CQI measurement. For example, in some embodiments, the gNB can specify the CSI-RS measurement restriction by using a parameter that is used for indicating measurement restriction for CQI measurement for DL transmission. As an example, in some embodiments, the gNB can specify the CSI-RS measurement restriction by using the "MeasRestrictionConfig-time-chann" parameter that it is already being used for DL transmission. In one embodiment, if a gNB indicates that a UE needs to measure a specific instance of a CSI-RS resource for downlink channel measurement, the UE needs to measure another specific CSI-RS for calculating precoding information of a SRS resource set for non-codebook based UL transmission.

In various embodiments, the UE may or may not be configured with the higher layer parameter such as the MeasRestrictionConfig-time-channel parameter used by the gNB for specifying the measurement restriction for CQI measurement. Thus, in accordance with the some embodiments, the UE performs a determination to check whether it is configured with the higher layer parameter. The following examples provide various embodiments based on whether a UE is configured with the higher layer parameter used by the gNB for specifying the measurement restriction for CQI measurement.

In a first embodiment, if the UE determines that it is not configured with the higher layer parameter used by the gNB for specifying the measurement restriction for CQI measurement, the UE derives the channel measurements for computing CQI value reported in uplink slot n based on only the non-zero power (NZP) CSI-RS, no later than the CSI reference resource, associated with the CSI resource setting; and the UE derives the channel measurements for computing precoder for a SRS resource set scheduled in uplink slot n based on only the CSI-RS associated with the SRS resource set. However, if the UE determines that it is configured with the higher layer parameter used by the gNB for specifying the measurement restriction for CQI measurement, the UE derives the channel measurements for computing the CQI value reported in the uplink slot n based on only a most recent, no later than the CSI reference resource, occasion of the NZP CSI-RS associated with the CSI resource setting; and derives the channel measurements for computing precoder for the SRS resource set scheduled in the uplink slot n based on only a latest CSI-RS resource associated with the SRS resource set that ends prior to 42 symbols before the SRS resource set is transmitted.

In a second embodiment, if the UE determines that it is not configured with the higher layer parameter used by the gNB for specifying the measurement restriction for CQI measurement, the UE derives channel measurements for computing a CQI value reported in uplink slot n based on only a NZP CSI-RS, no later than a CSI reference resource, associated with a CSI resource setting; and derives channel measurements for computing precoder for the SRS resource set scheduled in uplink slot n based on only the CSI-RS associated with the SRS resource set. In the second embodiment, if the UE determines that it is configured with the higher layer parameter used by the gNB for specifying the measurement restriction for CQI measurement, the UE derives the channel measurements for computing the CQI value reported in the uplink slot n based on only a most recent, no later than the CSI reference resource, occasion of the NZP CSI-RS associated with the CSI resource setting; and derives the channel measurements for computing precoder for the SRS resource set scheduled in the uplink slot n based on only a first CSI-RS resource associated with the SRS resource set after an indication of dynamic SRS transmission request.

In a third embodiment, if the UE determines that it is not configured with the higher layer parameter used by the gNB for specifying the measurement restriction for CQI measurement, the UE derives channel measurements for computing a CQI value reported in uplink slot n based on only a NZP CSI-RS, no later than a CSI reference resource, associated with a CSI resource setting; and derives channel measurements for computing precoder for the SRS resource set scheduled in uplink slot n based on only the CSI-RS, no later than the CSI reference resource, associated with the SRS resource set. In the third embodiment, if the UE determines that it is configured with the higher layer parameter used by the gNB for specifying the measurement restriction for CQI measurement, the UE derives the channel measurements for computing CSI reported in uplink slot n based on only the most recent, no later than the CSI reference resource, occasion of NZP CSI-RS associated with the CSI resource setting; and derives the channel measurements for computing precoder for a SRS resource set scheduled in uplink slot n based on only the first CSI-RS resource associated with the SRS resource set after the indication of dynamic SRS transmission request.

Accordingly, the above written description provides various embodiments for enabling the measurement of a CSI-RS for non-codebook based UL transmission. For example, if there is more than one instance of CSI-RS resource associated with a SRS resource set for non-codebook based UL transmission, a gNB can indicate whether a UE needs to measure a specific instance(s) of the CSI-RS resource (or not) for calculating precoding information of the SRS resource set. In some embodiments, if the gNB indicates that the UE needs to measure a specific instance(s) of the CSI-RS resource, the UE measures the specific CSI-RS for calculating precoding information of a SRS resource set for non-codebook based UL transmission. If the gNB indicates that the UE does not need to measure a specific instance(s) of the CSI-RS resource, the UE determines how to utilize the measurement results of multiple instances of the CSI-RS resource for calculating precoding information of the SRS resource set as described above.

In any of the preceding embodiments, the following features/limitations may be further applied:

1. The gNB's indication of whether a UE needs to measure a specific instance(s) of the CSI-RS resource for calculating precoding information of the SRS resource set can be sent using a RRC message.

2. The gNB's indication can use the same RRC message with an indication for measurement restriction for the UE's CQI/CSI measurement.

3. The gNB's indication can be separate from the indication for measurement restriction for the UE's CQI/CSI measurement.

4. If the gNB does not deliver the indication, the UE can derive the precoding information based on unrestricted observation interval in time.

5. The gNB's indication is applied to P-CSI-RS resource.

6. The P-CSI-RS resource is associated with the SRS resource set.

7. The gNB's indication is applied to SP-CSI-RS resource.

8. The SP-CSI-RS resource is associated with the SRS resource set.

An advantage of the disclosed embodiments include being able to provide a more accurate measurement of CSI-RS by a UE for calculating precoder of a SRS resource set for non-codebook based UL transmission. Another advantage is that a gNB can adjust beams for CSI-RS adaptively and indicate to a UE to measure the CSI-RS properly for non-codebook based UL transmission.

Figure 12:
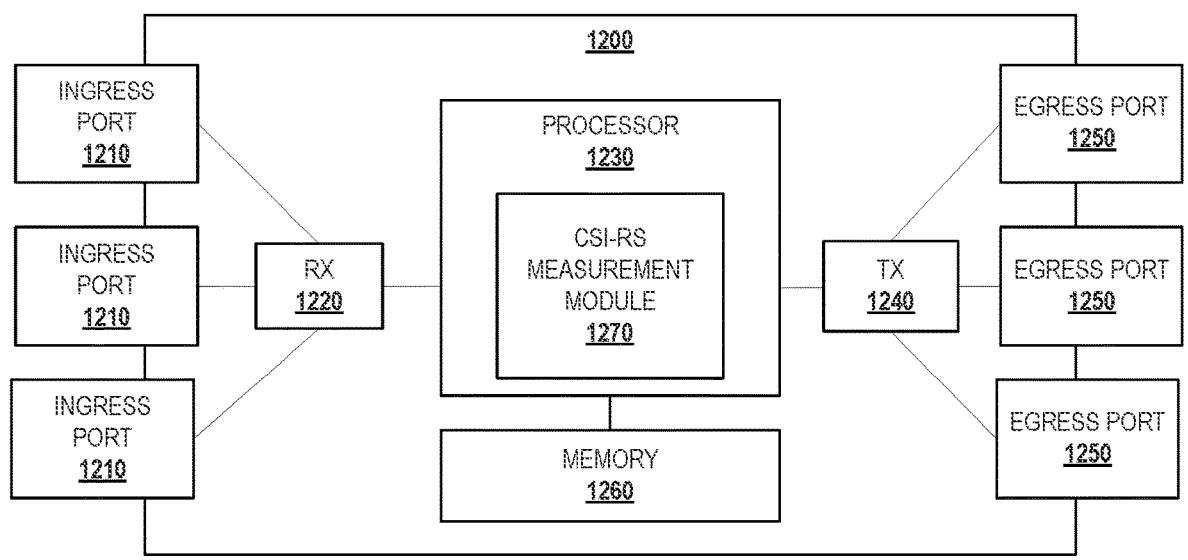
FIG. 12 is a schematic diagram of an example apparatus configured to implement one or more of the methods disclosed herein according to an embodiment of the disclosure.

FIG. 12 is a schematic diagram of an example apparatus 1200 configured to implement one or more of the methods disclosed herein according to an embodiment of the disclosure. For example, the apparatus 1200 may represent a gNB or a UE that is configured to perform the methods described herein. The apparatus 1200 includes ingress ports 1210 and receiver units (Rx) 1220 for receiving data. The apparatus 1200 includes a processor, logic unit, or central processing unit (CPU) 1230 to process the data and execute various instructions. The apparatus 1200 includes transmitter units (Tx) 1240 and egress ports 1250 for transmitting data. The apparatus 1200 includes a memory 1260 for storing the data and executable instructions. The apparatus 1200 may also comprise optical-to-electrical (OE) components and electrical-to-optical (EO) components (not depicted) coupled to the ingress ports 1210, the receiver units 1220, the transmitter units 1240, and the egress ports 1250 for converting optical signal to electrical signals, and vice versa.

The memory 1260 may include one or more disks, tape drives, or solid-state drives and may be used as an over-flow data storage device, to store programs when such programs are selected for execution, or to store instructions and data that are read during program execution. The memory 1260 may be volatile and/or non-volatile and may be read-only memory (ROM), random-access memory (RAM), ternary content-addressable memory (TCAM), or static random-access memory (SRAM).

The processor 1230 may be implemented by any suitable combination of hardware, middleware, firmware, and software. The processor 1230 may be implemented as one or more CPU chips, cores (e.g. as a multi-core processor), field-programmable gate arrays (FPGAs), application specific integrated circuits (ASICs), or digital signal processors (DSPs). The processor 1230 is in communication with the ingress ports 1210, receiver units 1220, transmitter units 1240, egress ports 1250, and memory 1260.

In one embodiment, the memory 1260 may store a CSI-RS measurement module 1270. The CSI-RS measurement module 1270 includes computer executable instructions for performing the steps of the various embodiments. The processor 1230 is configured to execute these instructions along with other instructions associated with the apparatus 1200. In various embodiments, the apparatus 1200 can include additional or alternative components than those described in FIG. 12 for implementing the various embodiments disclosed herein.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method performed by a base station for measuring a channel state information reference signal (CSI-RS) for non-codebook based uplink (UL) transmission, the method comprising:

transmitting information relating to a sounding reference signal (SRS) resource set for the non-codebook based UL transmission, information relating to a CSI-RS resource, and information relating to CSI-RS measurement restriction;

transmitting a CSI-RS over the CSI-RS resource, for measurement of the CSI-RS according to the CSI-RS measurement restriction, the measurement for determining precoding information for the SRS resource set;

receiving the SRS resource set;

measuring the SRS resource set, and determining one or more SRS resources within the SRS resource set to be used for precoding the non-codebook based UL transmission;

transmitting a downlink control information (DCI) that indicates the SRS resources within the SRS resource set to be used for precoding the non-codebook based UL transmission; and receiving the non-codebook based UL transmission.

2. The method of claim 1, wherein the CSI-RS measurement restriction specifies that the CSI-RS resource associated with the SRS resource set for the non-codebook based UL transmission that is to be measured occurs at least a first time before a transmission of the SRS resource set.

3. The method of claim 1, wherein the CSI-RS measurement restriction specifies that the CSI-RS resource associated with the SRS resource set for the non-codebook based UL transmission that is to be measured occurs at a first instance after a message that triggers a transmission of the SRS resource set.

4. The method of claim 1, wherein the CSI-RS measurement restriction specifies that the CSI-RS resource associated with the SRS resource set for the non-codebook based UL transmission that is to be measured occurs at a latest instance before a message that triggers a transmission of the SRS resource set.

5. The method of claim 1, wherein the CSI-RS measurement restriction specifies that the CSI-RS resource associated with the SRS resource set for the non-codebook based UL transmission that is to be measured is one or more CSI-RS resources associated with the SRS resource set for the non-codebook based UL transmission that occurs after a message that triggers a transmission of the SRS resource set and a first time before scheduling a transmission of the SRS resource set.

6. The method of claim 1, wherein the CSI-RS measurement restriction specifies that the CSI-RS resource associated with the SRS resource set for the non-codebook based UL transmission that is to be measured is one or more CSI-RS resources associated with the SRS resource set for the non-codebook based UL transmission that occurs between a latest instance before a message that triggers a transmission of the SRS resource set and a first time before a transmission of the SRS resource set.

7. The method of claim 1, wherein the information relating to the CSI-RS measurement restriction is transmitted in a first radio resource control (RRC) message, and an indication for measurement restriction for a channel quality indicator (CQI) measurement and a channel state information (CSI) measurement of a user equipment (UE) is transmitted in a second RRC message.

8. The method of claim 1, wherein the information relating to the CSI-RS measurement restriction is applied to a periodic channel state information reference signal (P-CSI-RS) resource that is associated with the SRS resource set.

9. The method of claim 1, wherein the information relating to the CSI-RS measurement restriction is applied to a semi-periodic channel state information reference signal (SP-CSI-RS) resource that is associated with the SRS resource set.

10. The method of claim 1, wherein the information relating to the CSI-RS measurement restriction is transmitted in a radio resource control (RRC) message.

11. The method of claim 10, wherein the RRC message comprises an indication for measurement restriction for a channel quality indicator (CQI) measurement and a channel state information (CSI) measurement of a user equipment (UE).

12. A base station comprising:
a transmitter configured to transmit information relating to a sounding reference signal (SRS) resource set for a non-codebook based uplink (UL) transmission, information relating to a channel state information reference signal (CSI-RS) resource, information relating to CSI-RS measurement restriction, and a CSI-RS over the CSI-RS resource, for measurement of the CSI-RS according to the CSI-RS measurement restriction, the measurement for determining precoding information for the SRS resource set;
a receiver configured to receive the SRS resource set;
a processor configured to execute instructions to measure the SRS resource set, and determine one or more SRS resources within the SRS resource set to be used for precoding the non-codebook based UL transmission;
the transmitter configured to transmit a downlink control information (DCI) that indicates the SRS resources within the SRS resource set to be used for precoding the non-codebook based UL transmission; and
the receiver configured to receive the non-codebook based UL transmission.

13. The base station of claim 12, wherein the CSI-RS measurement restriction specifies that the CSI-RS resource associated with the SRS resource set for the non-codebook based UL transmission that is to be measured occurs at least a first time before a transmission of the SRS resource set.

14. The base station of claim 12, wherein the CSI-RS measurement restriction specifies that the CSI-RS resource associated with the SRS resource set for the non-codebook based UL transmission that is to be measured occurs at a first instance after a message that triggers a transmission of the SRS resource set.

15. The base station of claim 12, wherein the CSI-RS measurement restriction specifies that the CSI-RS resource associated with the SRS resource set for the non-codebook based UL transmission that is to be measured occurs at a latest instance before a message that triggers a transmission of the SRS resource set.

16. The base station of claim 12, wherein the information relating to the CSI-RS measurement restriction is transmitted in a first radio resource control (RRC) message, and an indication for measurement restriction for a channel quality indicator (CQI) measurement and a channel state information (CSI) measurement of a user equipment (UE) is transmitted in a second RRC message.

17. A method performed by a user equipment (UE) for measuring a channel state information reference signal (CSI-RS) for non-codebook based uplink (UL) transmission, the method comprising:
receiving information relating to a sounding reference signal (SRS) resource set for the non-codebook based UL transmission, information relating to a CSI-RS resource, and information relating to CSI-RS measurement restriction;
measuring the CSI-RS resource based on the information relating to the CSI-RS measurement restriction;
determining precoding information for the SRS resource set based on the measurement of the CSI-RS resource;
transmitting the SRS resource set precoded based on the precoding information for the SRS resource set;
receiving a downlink control information (DCI) that indicates the SRS resources within the SRS resource set to be used for precoding the non-codebook based UL transmission; and
transmitting the non-codebook based UL transmission using precoding according to the indicated SRS resources.

18. The method of claim 17, further comprising:
determining whether the UE is configured with a higher layer parameter that specifies a measurement restriction for a channel quality indicator (CQI) measurement;
responsive to a determination that the UE is not configured with the higher layer parameter:
deriving channel measurements for computing a CQI value reported in an uplink slot based on only a non-zero power (NZP) CSI-RS, no later than a CSI reference resource, associated with a CSI resource setting; and
deriving the channel measurements for computing a precoder for the SRS resource set scheduled in the uplink slot based on only the CSI-RS associated with the SRS resource set;
responsive to a determination that the UE is configured with the higher layer parameter:
deriving the channel measurements for computing the CQI value reported in the uplink slot based on only a most recent, no later than the CSI reference resource, occasion of the NZP CSI-RS associated with the CSI resource setting; and
deriving the channel measurements for computing the precoder for the SRS resource set scheduled in the uplink slot based on only a latest CSI-RS resource associated with the SRS resource set that ends prior to 42 symbols before the SRS resource set is transmitted.

19. The method of claim 17, further comprising:
determining whether the UE is configured with a higher layer parameter that specifies a measurement restriction for a channel quality indicator (CQI) measurement;
responsive to a determination that the UE is not configured with the higher layer parameter:
deriving the channel measurements for computing a CQI value reported in an uplink slot based on only a non-zero power (NZP) CSI-RS, no later than a CSI reference resource, associated with a CSI resource setting; and
deriving the channel measurements for computing a precoder for the SRS resource set scheduled in the uplink slot based on only the CSI-RS associated with the SRS resource set;
responsive to a determination that the UE is configured with the higher layer parameter:
deriving the channel measurements for computing the CQI value reported in the uplink slot based on only a most recent, no later than the CSI reference resource, occasion of the NZP CSI-RS associated with the CSI resource setting; and
deriving the channel measurements for computing the precoder for the SRS resource set scheduled in the uplink slot based on only a first CSI-RS resource associated with the SRS resource set after an indication of dynamic SRS transmission request.

20. The method of claim 17, further comprising:

determining whether the UE is configured with a higher layer parameter that specifies a measurement restriction for a channel quality indicator (CQI) measurement;

responsive to a determination that the UE is not configured with the higher layer parameter:

deriving channel measurements for computing a CQI value reported in an uplink slot based on only a non-zero power (NZP) CSI-RS, no later than a CSI reference resource, associated with a CSI resource setting; and deriving the channel measurements for computing a precoder for the SRS resource set scheduled in the uplink slot based on only the CSI-RS, no later than the CSI reference resource, associated with the SRS resource set;

responsive to a determination that the UE is configured with the higher layer parameter:

deriving the channel measurements for computing the CQI value reported in the uplink slot based on only a most recent, no later than the CSI reference resource, occasion of the NZP CSI-RS associated with the CSI resource setting; and deriving the channel measurements for computing the precoder for the SRS resource set scheduled in the uplink slot based on only a most recent, no later than the CSI reference resource, occasion of the CSI-RS resource associated with the SRS resource set.

* * * * *